US008949243B1

(12) United States Patent
Kashyap et al.

(10) Patent No.: US 8,949,243 B1
(45) Date of Patent: Feb. 3, 2015

(54) SYSTEMS AND METHODS FOR DETERMINING A RATING FOR AN ITEM FROM USER REVIEWS

(75) Inventors: Anand Kashyap, San Jose, CA (US); Karthik Ragunath Balasundaram, Irvine, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/339,108

(22) Filed: Dec. 28, 2011

(51) Int. Cl.
*G06F 17/30* (2006.01)
(52) U.S. Cl.
USPC .......................................................... 707/739
(58) Field of Classification Search
USPC .......................................................... 707/739
See application file for complete search history.

(56) References Cited

U.S. PATENT DOCUMENTS

| 7,987,188 | B2* | 7/2011 | Neylon et al. ............ 707/739 |
| 2005/0222791 | A1* | 10/2005 | Masumoto et al. ............ 702/81 |
| 2009/0048823 | A1* | 2/2009 | Liu et al. ............ 704/9 |
| 2009/0083096 | A1* | 3/2009 | Cao et al. ............ 705/7 |
| 2009/0193328 | A1* | 7/2009 | Reis et al. ............ 715/231 |
| 2011/0185354 | A1* | 7/2011 | Tanner et al. ............ 717/178 |
| 2012/0245924 | A1* | 9/2012 | Brun ............ 704/9 |

OTHER PUBLICATIONS

Lu et al., Rated Aspect Summarization of Short Comments, 2009.*
Read, Jonathon. "Using emoticons to reduce dependency in machine learning techniques for sentiment classification." Proceedings of the ACL Student Research Workshop. Association for Computational Linguistics, 2005.*
Gamon, Michael, Aue, Anthony, Corston-Oliver, Simon, Ringger, and Eric, Pulse: Mining Customer Opinions from Free Text . In the Proceedings of IDA-05, the 6th International Symposium on Intelligent Data Analysis , pp. 121-132, 2005.
Li Zhuang, Feng Jing, Xiao-Yan Zhu, Movie review mining and summarization. In the Proceedings of CIKM'06, Proceedings of the 15th ACM international conference on Information and knowledge management, 2006.
Minqing Hu, Bing Liu, Mining and summarizing customer reviews. In the Proceedings of KDD '04, Proceedings of the tenth ACM SIGKDD international conference on Knowledge discovery and data mining, 2004.

* cited by examiner

*Primary Examiner* — William Spieler
(74) *Attorney, Agent, or Firm* — Holland & Hart LLP

(57) ABSTRACT

A computer-implemented method to determine a rating of an item is described. At least one user review with textual information relating to the item is collected. A rating for at least one sentence of the textual information is calculated. An overall rating for the item is determined based on the calculated rating for the at least one sentence of the textual information.

18 Claims, 11 Drawing Sheets

SYSTEMS AND METHODS FOR DETERMINING A RATING FOR AN ITEM FROM USER REVIEWS

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often require human and computer interaction. Users of computer technologies continue to demand an increase in the efficiency of these technologies. Improving the efficiency of computer technologies is always desirable to anyone who uses and relies on computers. Computing systems may be mobile so that users may carry these systems as they travel, shop, work, etc.

Computing systems may also allow consumers of products and services to provide a user review of such product or service. For example, a consumer may purchase an object and rate the object using an online forum. Potential consumers of the object may research the pros and cons of the object by accessing the user reviews. The reviews may allow the consumers to select a rating for the object (e.g., using a 5-star rating system) and/or provide a textual rating about the object. The potential consumers may view the ratings for the object given by consumers of the object. They may also read the textual rating regarding the object.

SUMMARY

According to at least one embodiment, a computer-implemented method to determine a rating of an item is described. At least one user review with textual information relating to the item is collected. A rating for at least one sentence of the textual information is calculated. An overall rating for the item is determined based on the calculated rating for the at least one sentence of the textual information. In one example, the item may be a mobile application.

In one embodiment, a domain may be assigned to the at least one sentence. The domain may represent a certain attribute of the item. The rating of the at least one sentence assigned to a domain may be aggregated with ratings of additional sentences assigned to the domain. The additional sentences may be included in textual information of additional user reviews of the item. A rating for the domain of the item may be calculated based on the aggregated ratings of sentences assigned to the domain.

In one example, one or more feature descriptors may be identified in the textual information of the user review. The feature descriptors may include a noun and an adjective.

The calculation of the rating for the at least one sentence may include accessing a database to determine a rating for one or more words in the at least one sentence, aggregating the ratings for the one or more words in the at least one sentence, and calculating the rating of the at least one sentence based on the aggregated ratings for the one or more words.

In one embodiment, a database may be created. Creating the database may include collecting a plurality of user reviews with textual information relating to the item, identifying a feature descriptor from at least one of the plurality of user reviews, assigning a rating to the feature descriptor, and storing the feature descriptor and the assigned rating the database. In one configuration, assigning the rating may include calculating a frequency of occurrence of the feature descriptor in the textual information of the plurality of user reviews, obtaining a user assigned rating for each of the user reviews that comprise the feature descriptor, and calculating the rating for the feature descriptor based on the calculated frequency of occurrence and the user assigned rating.

A computing device configured to determine a rating of an item is also described. The device may include a processor and memory in electronic communication with the processor. The device may further include a ratings module stored in the memory and executable by the processor. The ratings module may be configured to collect at least one user review with textual information relating to the item, calculate a rating for at least one sentence of the textual information, and determine an overall rating for the item based on the calculated rating for the at least one sentence of the textual information.

A computer-program product for determining a rating of an item is also described. The computer-program product may include a non-transitory computer-readable medium having instructions thereon. The instructions may include code programmed to collect at least one user review with textual information relating to the item, code programmed to calculate a rating for at least one sentence of the textual information, and code programmed to determine an overall rating for the item based on the calculated rating for the at least one sentence of the textual information.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
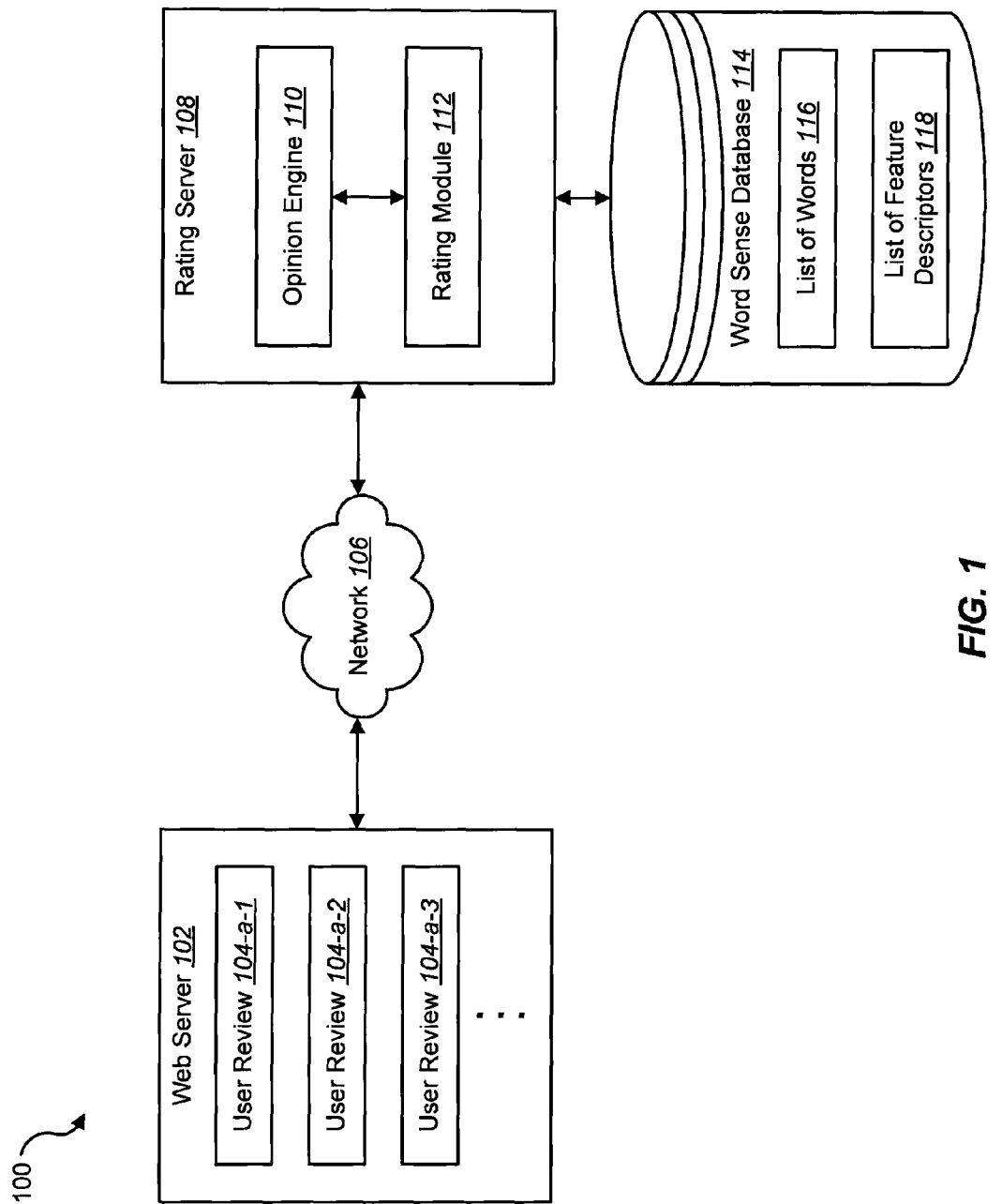
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The Internet provides a convenient platform for consumers to post reviews of products and services they purchase. Potential consumers may then access these reviews to assist themselves with their decision on whether to purchase that particular product or service. In addition to products and services, reviews may be submitted for events (e.g., concerts, movies), places (e.g., restaurants), and the like. Reviews may include a numerical (or other symbol-based) ranking, such as a 5-star scale ranking. Reviews may also (but not necessarily) include free form textual information submitted by the consumer.

In one example, consumers may submit reviews of mobile applications designed to be installed and executed on mobile devices. These reviews may also include a numerical ranking and possibly textual information. In one configuration, the textual information may include useful pieces of information that further illustrate the consumer's opinion about the mobile application. This information may go unnoticed or unobserved by individuals while they browse the reviews for a mobile application. The present systems and methods may use data mining techniques to mine the text in such user reviews to develop statistical metrics to rate the quality of a mobile application. The present systems and methods may combine text mining techniques, and domain knowledge pertaining to the item being reviewed, to rate such items. While the examples provided below relate to the rating of mobile applications, it is to be understood that the present systems and methods may be implemented to rate any type of item such as, but not limited to, products, services, events, locations, businesses, and the like. The ratings provided by the present system and methods may encompass various aspects of an application, such as, but not limited to, the security and privacy vulnerabilities, performance, resource usage, user experience, security, and ease of use.

In one example, mobile applications may be hosted on online platforms, such as, for example, the Apple App Store for iPhones® and Google Market Place for Android® phones. The present systems and methods may provide potential customers with ratings for applications. The potential customers may then make a more informed decision before deciding to buy a mobile application from these platforms.

Mobile applications, similar to their desktop counterparts, may be rated by users using a 5-star rating scale. The market places that host mobile applications typically average these ratings to generate a reputation score for the applications. This average score, however, may not always be representative of users' opinions about an application. For example, the ratings may be biased due to detractors or fan-boys (who generally provide 1 or 5 stars, respectively, for a rating), but do not provide any textual information (i.e., a written review). A text review may include a wealth of information with specific details about the application. A thorough analysis across all text reviews may bring out more detailed reputation information that may be used to provide a more accurate reputation score for the application. For example, the Skype® application may have a mean score of "4 stars" as rated by its reviewers. A thorough text analysis, however, may reveal that while the users like the application's utility and usability, it does not perform very well in terms of battery usage. The present system and methods may mine the review text to obtain fine-grained information about various domains of an application, such as performance, utility, ease of use, battery usage, security, and the like.

FIG. 1 is a block diagram illustrating one embodiment of an environment 100 in which the present systems and methods may be implemented. In one example, a web server 102 may communicate with a rating server 108 across a network 106 connection. The web server 102 may host a number of user reviews 104. The user reviews may be reviews for an item (e.g., product, service, event, concert, location, business, etc.). In one embodiment, the reviews 104 may be for a mobile application. The reviews 104 may be stored in connection with an online platform that offers mobile applications for purchase, such as the Apple App Store, Google Marketplace, and the like.

The rating server 108 may download one or more reviews 104 and determine a rating for the mobile application associated with the reviews 104. The rating server 108 may include an opinion engine 110 and a rating module 112. The opinion engine 110 may determine a score for certain aspects of the user reviews 104. The opinion engine 110 may be a computational engine that executes the functions of the rating module 112 to determine an overall score for the mobile application as well as a score for separate domains of the mobile application. For example, the rating module 112 may determine a score for the ease of use of the mobile application, the battery consumption rate of the application, the performance of the application, the security of the mobile application, and the like. Details regarding the opinion engine 110 and the rating module 112 will be described below.

In one configuration, the rating server 108 may communicate with a word sense database 114. The database 114 may be separate from the rating server 108. Or, the database 114 may be stored within the server 108. In one example, the database 114 may include a list of words 116 and a list of feature descriptors 118. The list of words 116 may include words that are included in the textual information of a user review 104. For example, the list of words 116 may include verbs, adjectives, adverbs, etc. The list of feature descriptors 118 may include a combination of words. For example, the list 118 may include "great application", "easy to use", "beautiful graphics", and the like. The rating server 108 may access the information stored in the database 114 to determine the overall rating for the mobile application as well as a score for individual domains of the mobile application.

Figure 2:
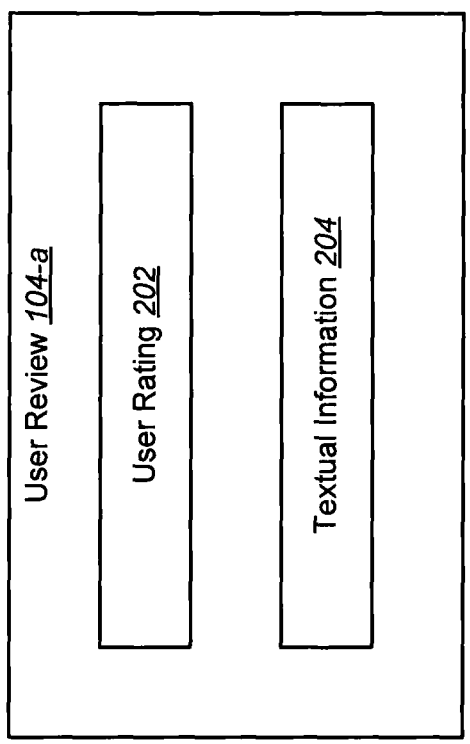
FIG. 2 is a block diagram illustrating one example of a user review.

FIG. 2 is a block diagram illustrating one example of a user review 104-*a*. The review 104-*a* may be an example of the user reviews 104 illustrated in FIG. 1. In one configuration, the review 104 may include a user rating 202 and textual information 204. The user rating 202 may be a numerical (or some other indicator) to represent the score given to an item by the user. For example, the user rating 202 may be based on a 5-star rating scale. The user of the item may rate the item as a 4-star item. As a result, the user rating 202 may be "4-stars". The textual information 204 may represent free form text that the user entered about the item. For example, the textual information 204 may include sentences similar to "This is a great application. It is very easy to use and has great graphics. The application, however, uses a large amount of battery power to execute".

Figure 3:
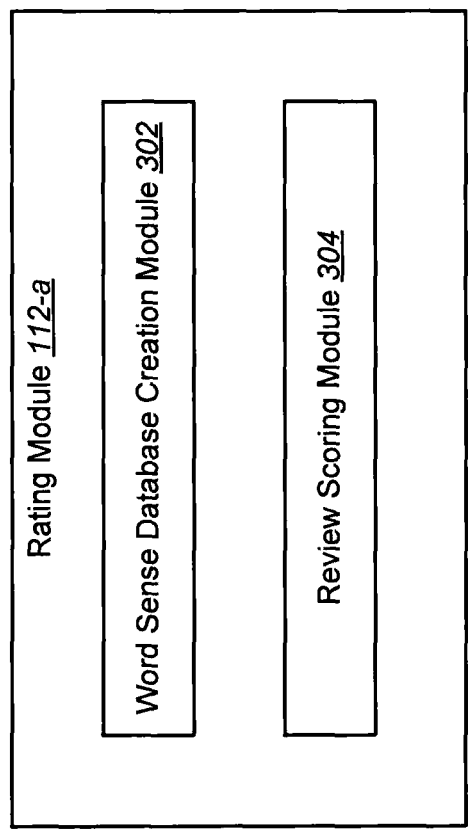
FIG. 3 is a block diagram illustrating one configuration of a rating module that may implement the present systems and methods.

FIG. 3 is a block diagram illustrating one configuration of a rating module 112-a that may implement the present systems and methods. The module 112-a may be an example of the rating module 112 of FIG. 1. In one example, the rating module 112-a may include a word sense database creation module 302. The creation module 302 may create a database, such as the word sense database 114. The creation module 302 may further train the rating module 112-a to determine an overall rating for a mobile application as well as a rating for different domains of the application based on the data stored in the created database 114.

The rating module 112-a may also include a review scoring module 304. The module 304 may determine the overall and domain ratings for an application. In one configuration, the review scoring module 304 may be trained by the word sense database creation module 302. Details regarding the rating module 112-a will be described below.

Figure 4:
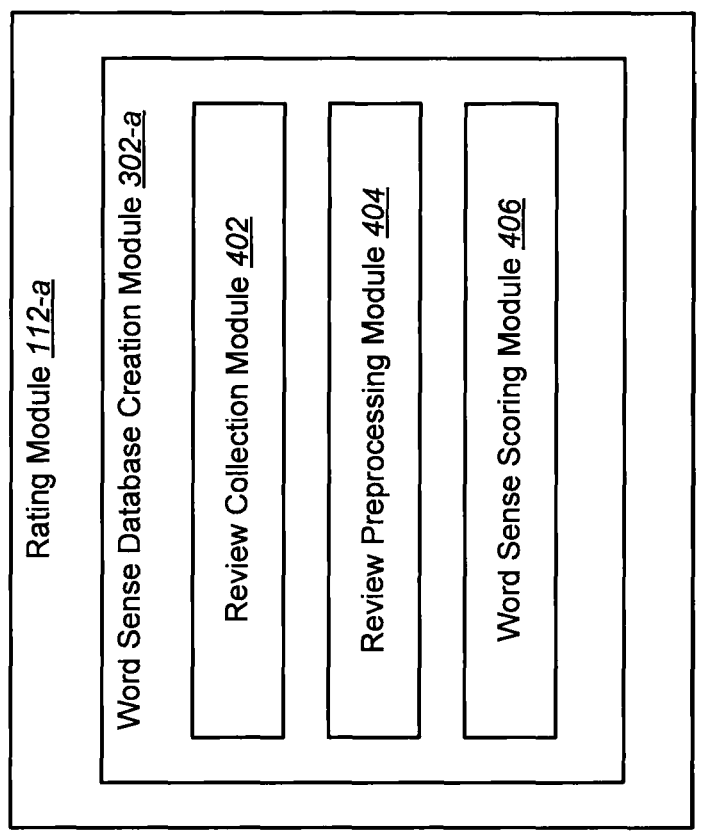
FIG. 4 is a block diagram illustrating one example of a rating module.

FIG. 4 is a block diagram illustrating one example of a rating module 112-a, which may be an example of the rating module 112 of FIG. 1 or 3. The module 112-a may include a word sense database creation module 302-a that may be implemented to build the database 114. In one embodiment, the module 302-a may include a review collection module 402, a review preprocessing module 404, and a word sense scoring module 406. The review collection module 402 may communicate with a server hosting user reviews, such as the host server 102. The collection module 402 may retrieve reviews for a number of different mobile applications from websites that host such reviews. The collection module 402 may also collect user reviews via a search for reviews for a particular mobile application when a user enters the name of the mobile application. The collection module 402 may collect user reviews from online platforms that store such reviews, for example, but not limited to, Apple App Store, Google Marketplace, Amazon, and the like.

When the user reviews have been collected, the review preprocessing module 404 may perform certain actions on each review. For example, Hyper-Text Markup Language (HTML) tags may be removed from the textual information of each collected user review. Further, HTML codes that represent symbols may be decoded. For example, the HTML code "$" included in the textual information may be decoded by the preprocessing module 404 to the symbol "$". The module 404 may also perform a spell check for spelling errors within the textual information section of each user review. User reviews that include a certain number of spelling errors may be discarded by the rating module 112-a. In addition, user reviews that do not include textual information may also be discarded.

The review processing module 404 may also map Web acronyms in the textual information to their corresponding words in well-formatted English. For example, the acronym "GM" may be mapped to the words "Good Morning". Similarly, the acronym "LOL" may be mapped to the words "Laughing Out Loud". The preprocessing module 404 may also identify contractions (e.g., don't, shouldn't, can't, etc.) within the textual information. The module 404 may resolve the identified contractions to their expanded form (e.g., do not, should not, cannot, etc.). Further, icons, such as "smiley icons" that are within the textual information may be extracted and a corresponding score may be assigned to such icons based on the emotion they express. For example, an icon that represents a smiley face may receive a higher score than an icon that represents a frowning face.

In one embodiment, the word sense scoring module 406 may tag each of the preprocessed user reviews using a part of speech tagger. In one embodiment, the Stanford Maximum Entropy Part of Speech tagger may be used to tag some or all of the words in the textual information section of each review. Sentences in the textual information that are ill-formed (i.e., lack proper parts of speech within the sentence) may be rejected by the word sense scoring module 406. As a result, these ill-formed sentences may be discarded and ignored for purposes of building the word sense database 114.

In one configuration, the scoring module 406 may identify feature descriptors within the textual information across the collected user reviews. The identified feature descriptors may be assigned a score based on the frequency the descriptors appear in user reviews and the corresponding user rating for the review. For example, the module 406 may identify the feature descriptor "great application" in the textual information of a number of different user reviews for different applications. Each of these user reviews may also have a user rating of 4 or 5 stars.

The module 406 may determine that the descriptor "great application" is a positive sentiment describing the mobile applications. As a result, the module 406 may assign a high rating to the feature descriptor "great application".

The scoring module 406 may also identify individual verbs, adverbs, and adjectives across the collected user reviews for each mobile application. These words may be identified from the parts of speech tag that was previously tagged to each word. The module 406 may assign a score to these words in a manner similar to how a score was determined for feature descriptors. For example, the scoring module 406 may identify the adjective "difficult" across a number of user reviews for a number of different applications. Each of these user reviews may have a user rating of 1 or 2 stars. The module 406 may determine that the adjective "difficult" is a negative sentiment used to describe a mobile application. As a result, the module 406 may assign a low rating to the word "difficult". In one configuration, the ratings assigned by the scoring module 406 may be n a numerical scale between 0 and 1.

As previously described, the opinion of a word may be computed as a normalized weighted average of these frequencies, where the weights are assigned as user-assigned scores. For example, if the word "perfect" is found in 90% of the reviews with a score 5 that have been assigned by the users, and in 10% of the reviews with score 4, its normalized average opinion would be 0.98. A similar computation may be done for the feature descriptors (e.g., "worthless app"). The word sense database 114 may also associate the word and feature descriptors with the domain of a review in which a word is most likely to be used. For example, the phrase "battery hog" pertains to battery usage, while the phrase "crashes" pertains to performance.

In one example, the scoring module 406 may identify the domain for the identified feature descriptors and words. For example, the module 406 may identify the feature descriptor "battery drain". In addition to rating this descriptor, as described above, the module 406 may compare the words in the descriptor with a list of words corresponding to possible domains. The word(s) "battery" or "drain" may be included on a list of words corresponding to a power usage domain. The module 406 may then assign the feature descriptor "battery drain" to the domain of power usage. The scoring module 406 may perform a similar operation for each verb, adverb, and adjective that is identified. If a word is not included in a list of words corresponding to domains, the scoring module 406 may not assign a domain to that particular word.

In one embodiment, a generic word sense database that is publicly available may be used in accordance with the present systems and methods. For example, the database SentiWord-Net that is available at http://sentiwordnet.isti.cnr.it may be used as the word sense database 114. Further, the database 114 may be created by starting with a generic word sense database and incrementally modifying the database using the techniques described above.

Figure 5:
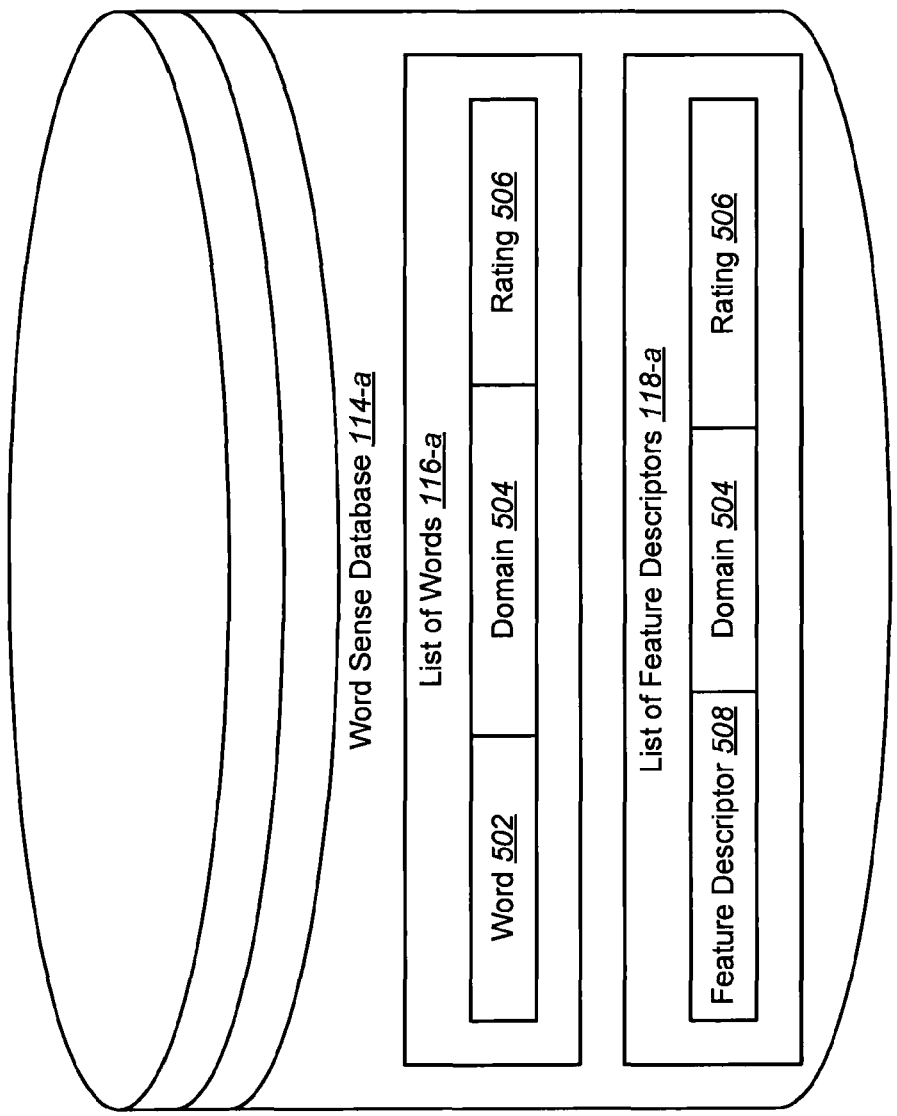
FIG. 5 illustrates one example of a word sense database.

In one example, the identified feature descriptors and words may be stored in the word sense database 114 along with their respective scores and domain assignment (if any). FIG. 5 illustrates one example of a word sense database 114-*a*, which may be an example of the database 114 of FIG. 1. The database 114-*a* may include a list of words 116-*a* and a list of feature descriptors 118-*a*. The list of words 116-*a* may include one or more words 502. Each word 502 may be associated with a rating 506, and possibly a domain 504. For example, one of the words 502 may be "unstable" and the rating 506 may be a low rating. The domain 504 may be "performance" for this particular word. Another word 502 may be "easy" and the rating 506 may be a high rating. The domain 504 may be "ease of use" for this word. Similarly, the list of feature descriptors 118-*a* may include one or more identified feature descriptors 508, an assigned rating 506, and possibly an assigned domain 504, as described above.

Figure 6:
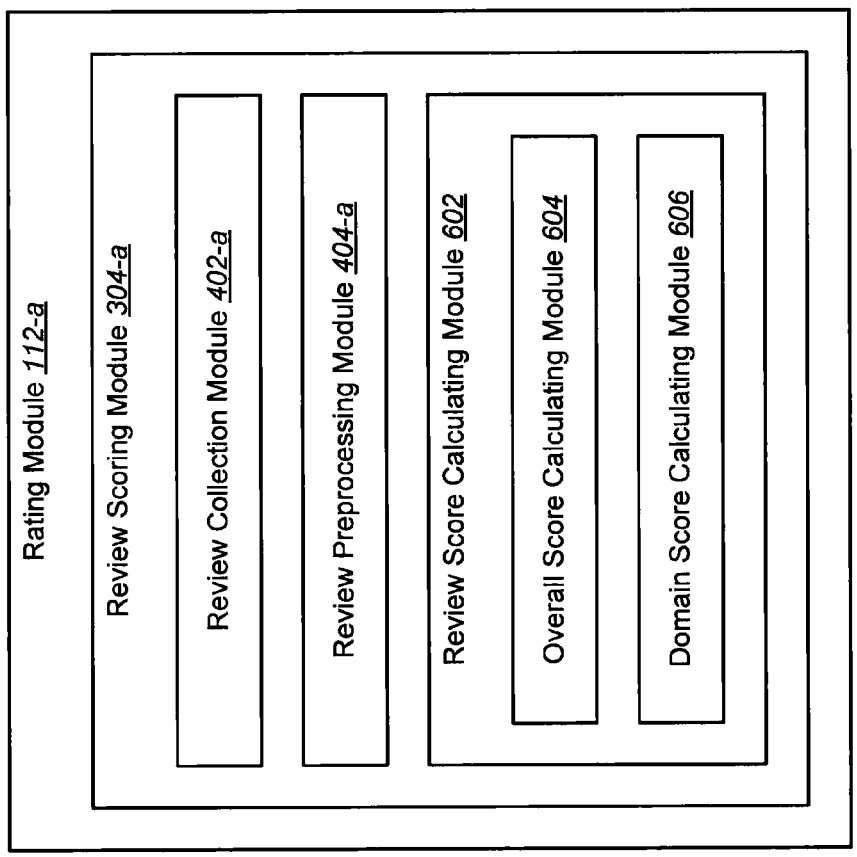
FIG. 6 is a block diagram illustrating one example of a rating module in accordance with the present system and methods.

FIG. 6 is a block diagram illustrating one example of a rating module 112-*a* in accordance with the present system and methods. The rating module 112-*a* may be an example of the module 112 of FIG. 1, 3, or 4. The module 112-*a* may include a review scoring module 304-*a*. The review scoring module 304-*a* may include a review collection module 402-*a*, a review preprocessing module 404-*a*, and a review score calculating module 602. The review collection module 402-*a* may crawl online platforms to retrieve user reviews for mobile applications. For example, the collection module 402-*a* may crawl websites that may host user reviews.

Collected user reviews may be preprocessed by the preprocessing module 404-*a*. For example, HTML tags may be removed from the textual information of each collected user review. Further, HTML codes that represent symbols may be decoded. For example, the HTML code "$" included in the textual information may be decoded by the preprocessing module 404-*a* to the symbol "$". The module 404-*a* may also perform a spell check for spelling errors within the textual information section of each user review. User reviews that include a certain number of spelling errors may be discarded. In addition, user reviews that do not include textual information may also be discarded.

The review processing module 404-*a* may also map Web acronyms in the textual information to their corresponding words in well-formatted English. For example, the acronym "GM" may be mapped to the words "Good Morning". Similarly, the acronym "LOL" may be mapped to the words "Laughing Out Loud". The preprocessing module 404-*a* may also identify contractions (e.g., don't, shouldn't, can't, etc.) within the textual information of the use reviews. The module 404-*a* may resolve the identified contractions to their expanded form (e.g., do not, should not, cannot, etc.). Further, icons, such as "smiley icons" that are within the textual information may be extracted and a corresponding score may be assigned to such icons based on the emotion they express. For example, an icon that represents a smiley face may receive a higher score than an icon that represents a frowning face.

The preprocessed reviews may be tagged using a part of speech tagger, such as, but not limited to, the Stanford Maximum Entropy Part of Speech tagger. A tagged user review may be passed to the opinion engine 110, which may be a computation engine that breaks down the review into sentences, and words, and uses the word sense database 114 to compute a rating for each sentence in the review Conjunctions within a sentence may cause a single sentence to be split into two different sentences. Each individual sentence of the textual information may be input to the opinion engine 110. The opinion engine 110 may determine a score for each individual tagged word (e.g., verb, adjective, adverb, etc.) within the sentence. The engine 110 may also determine a score for any feature descriptors within the sentence. The scores may be determined by the opinion engine 110 comparing each word or feature descriptor to the words and feature descriptors stored in the word sense database 114. Once a match is found, the opinion engine 110 may assign a rating to each word and feature descriptor based on the corresponding rating stored in the database 114. The opinion engine 110 may aggregate the ratings for each of the words and feature descriptors included in the sentence and calculate an overall opinion score for the sentence. During this step, negators (not), enhancers (more, very, etc.), and diminishers (less, little) within a sentence may be identified to strengthen or weaken the opinion as required. The overall opinion score may be on the scale between 0 and 5. The overall opinion score of the sentence is used by the review score calculating module 602. The module 602 may include an overall score calculating module 604 that aggregates this score with the other overall opinion scores calculated for each sentence in the textual information of a particular user review. The overall score calculating module 604 may calculate an overall score for the user review based on the aggregated opinion scores for each sentence in the review. The opinion engine 110 may then calculate a score for the mobile application. The score may be the mean score from the opinions (i.e., scores) of individual reviews.

The review score calculating module 602 may also include a domain score calculating module 606 to calculate a score for a number of domains for a particular mobile application. For example, a sentence may be input to the opinion engine 110. The engine 110 may compare the words and feature descriptors in the sentence to words and feature descriptors in the word sense database 114. A score for the words and feature descriptors in the sentence may be assigned based on the stored scores in the database 114 for the words and descriptors. As previously mentioned, some of the words and feature descriptors may also be assigned a particular domain. For example, the sentence may include the feature descriptor "beautiful graphics". This descriptor may have been previously stored in the database 114 with a corresponding score and domain, as previously described. For example, the score may be 0.9 (on a scale between 0 and 1) and the domain may be "user experience". The opinion engine 110 may calculate an overall score for the sentence as it relates to the domain "user experience". In this example, the engine 110 may assign a score of 5 (on a scale between 1 and 5) for this sentence with respect to the domain "user experience". The domain score calculating module 606 may aggregate this sentence score with other sentence scores that relate to "user experience" from additional user reviews. The module 606 may determine a domain score for the domain "user experience" for this particular mobile application based on the aggregated scores. As a result, the rating module 112-*a* (executed by the opinion engine 110) may produce an overall score for a mobile application as well as a number of domain scores for various domains of the application. These various domains may include, but are not limited to, user experience, battery usage, ease of use, and the like.

Figure 7:
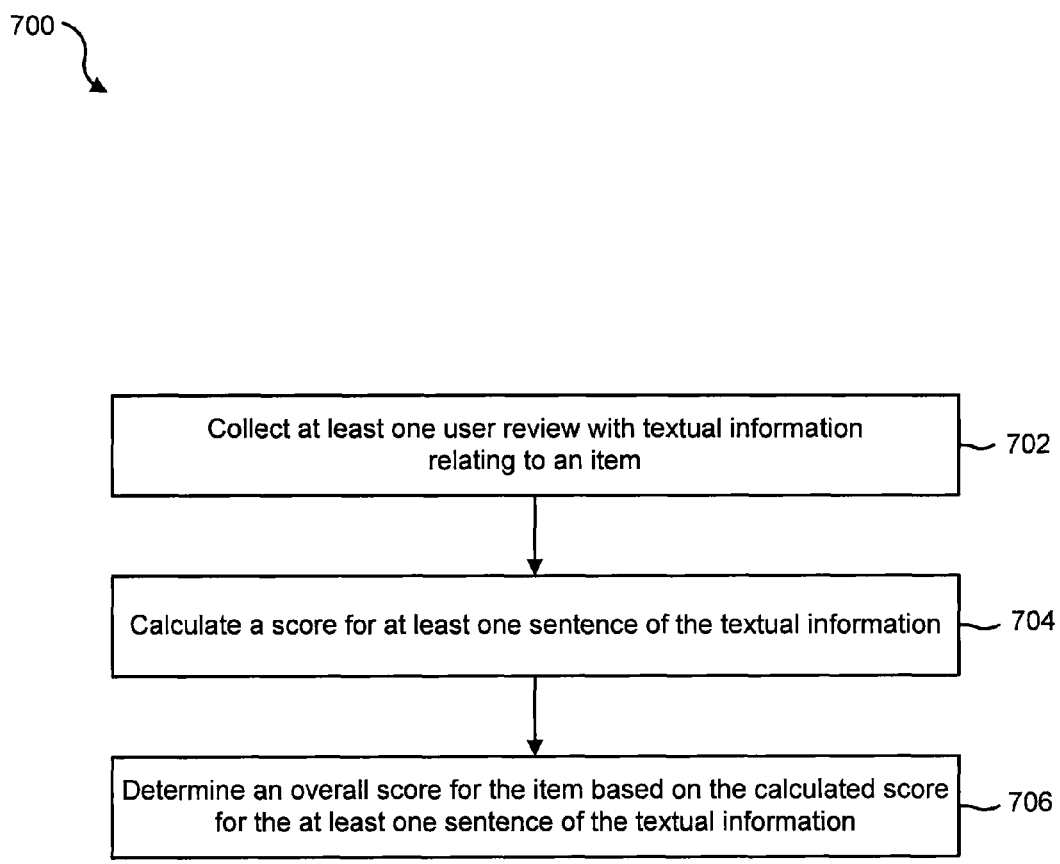
FIG. 7 is a flow diagram illustrating one embodiment of a method to determine a score for an item based on a user review of the item.

FIG. 7 is a flow diagram illustrating one embodiment of a method 700 to determine a score for an item based on a user review of the item. The method 700 may be implemented by the opinion engine 100 of FIG. 1 and the rating module 112 of FIG. 1, 3, 4, or 6. In one configuration, the opinion engine 110 may execute one or more sets of codes to control the functions of the ratings module 112.

At block 702, at least one user review with textual information relating to an item may be collected. The item may be a product or service, such as, but not limited to, a mobile application, an event, a location, a business, etc. At block 704, a score for the at least one sentence of the textual information may be calculated. At block 706, an overall score for the item may be determined based on the calculated score for the at least one sentence of the textual information.

Therefore, the method 700 analyzes textual information in a user review to determine an overall score for an item. It should be noted that the method 700 is just one implementation and that the operations of the method 700 may be rearranged or otherwise modified such that other implementations are possible.

Figure 8:
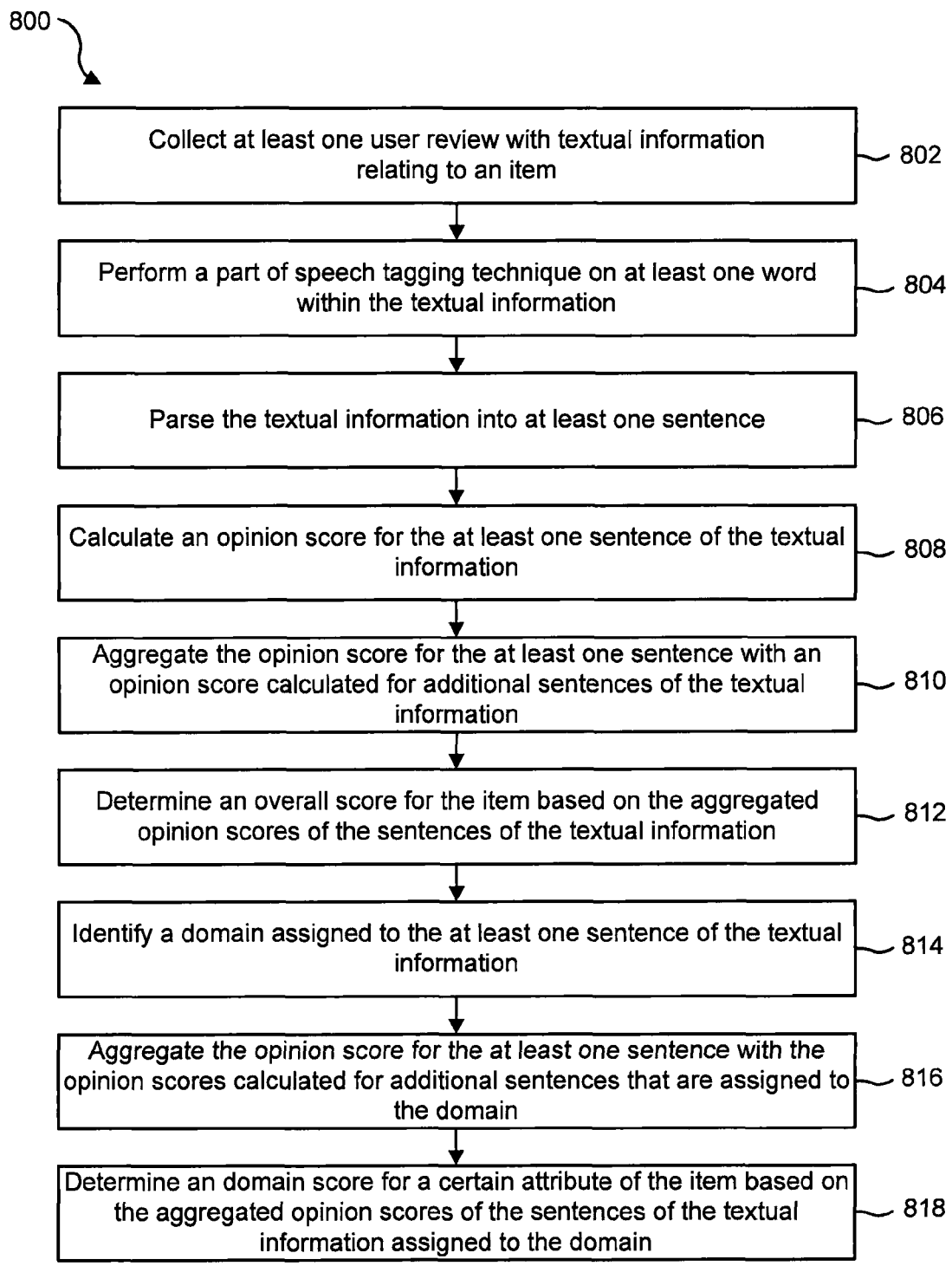
FIG. 8 is a flow diagram illustrating one embodiment of a method to determine an overall score for an item as well as one or more domain scores for various aspects of the item.

FIG. 8 is a flow diagram illustrating one embodiment of a method 800 to determine an overall score for an item as well as one or more domain scores for various aspects of the item. The method 800 may be implemented by the opinion engine 110 of FIG. 1 and the ratings module 112 of FIG. 1, 3, 4, or 6. In one configuration, the opinion engine 110 may execute one or more sets of codes to control the functions of the ratings module 112.

At block 802, at least one user review with textual information relating to an item may be collected. For example, the ratings module 112 may crawl one or more websites that host user reviews of items. At block 804, a part of speech tagging technique may be performed on at least one word within the textual information. For example, the technique may tag each verb, adjective, adverb, etc. in the textual information. At block 806, the textual information may be parsed into at least one sentence. At block 808, an opinion score for the at least one sentence of the textual information may be calculated. For example, the words in the at least one sentence may be assigned a rating based on ratings stored in the word sense database 114. The ratings for individual words may be aggregated to calculate a rating for the sentence.

At block 810, the opinion score for the at least one sentence may be aggregated with an opinion score calculated for additional sentences of the textual information. At block 812, an overall score for the item may be determined based on the aggregated opinion scores of the sentences of the textual information. At block 814, a domain assigned to the at least one sentence of the textual information may be identified. For example, a word or words of the sentence may be assigned a certain domain based on domain data stored in the database 114. The sentence may be assigned a domain based upon the domain assigned to words within the sentence.

At block 816, the opinion score for the at least one sentence may be aggregated with the opinion scores calculated for the additional sentences that are assigned to substantially the same domain. At block 818, a domain score may be determined for a certain attribute of the item based on the aggregated opinion scores of the sentences of the textual information assigned to the domain. For example, a first user review for an item may include a sentence that is assigned the domain "ease of use". The first sentence may also receive a rating of 3 stars. A second user review for the item may also include a sentence assigned to the "ease of use" domain. This sentence may receive a rating of 1 star. As a result, the aggregated and average rating for the sentences assigned to the "ease of use" domain may be 2 stars. Thus, potential customers that are deciding whether to purchase the item may learn that the item received a rating of 2 stars with respect to the "ease of use" of the item.

Therefore, the method 800 may determine an overall score for an item as well as a score for individual domains of the item based on the textual information of user reviews. It should be noted that the method 800 is just one implementation and that the operations of the method 800 may be rearranged or otherwise modified such that other implementations are possible.

Figure 9:
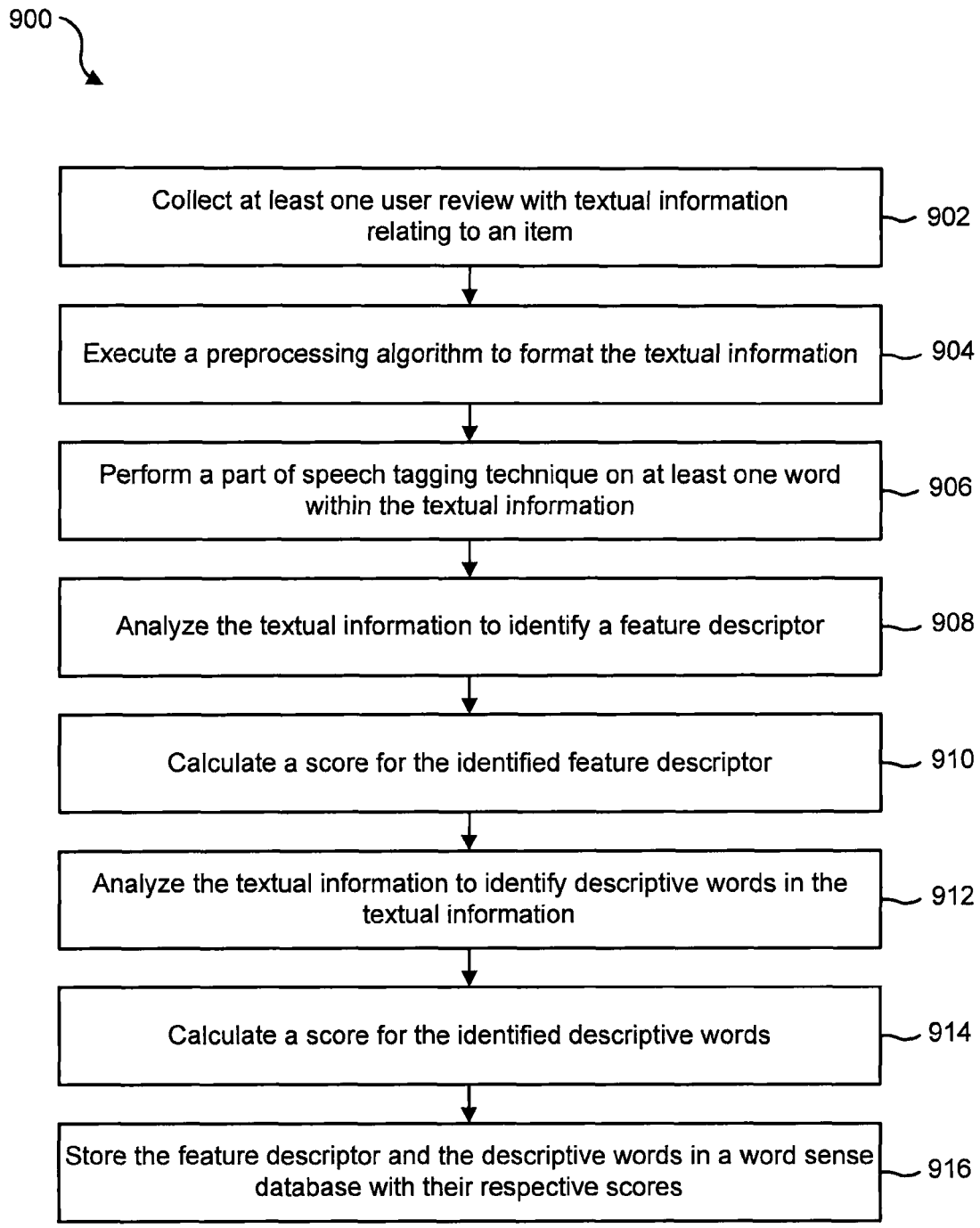
FIG. 9 is a flow diagram illustrating one embodiment of a method to create a word sense database.

FIG. 9 is a flow diagram illustrating one embodiment of a method to create a word sense database, such as the word sense database 114 of FIG. 1. The method 900 may be implemented by the ratings module 112 of FIG. 1, 3, 4, or 6.

At block 902, at least one user review with textual information relating to an item may be collected. At block 904, a preprocessing algorithm may be executed to format the textual information. For example, HTML tags may be removed from the textual information, acronyms may be mapped to the full-English text, etc. At block 906, a part of speech tagging technique may be performed on at least one word within the textual information. For example, verbs, adverbs, adjectives, etc. may be identified and tagged. At block 908, the textual information may be analyzed to identify a feature descriptor. At block 910, a score may be calculated for the identified feature descriptor. At block 912, the textual information may be analyzed to identify descriptive words in the textual information. At block 914, a score for the identified descriptive words may be calculated. A high score may be calculated if the frequency a particular word or feature descriptor appears in user reviews with high user ratings. Similarly, a low score may be calculated if the frequency of a particular word or feature descriptor appears in user reviews with low user ratings. At block 916, the feature descriptor and the descriptive words may be stored in a word sense database with their respective scores. In addition, at least a portion of the words and feature descriptors may be associated with a particular domain (e.g., power usage, ease of use, etc.). The associated domain may be stored in the database 114 with the accompanying word and/or feature descriptor.

Therefore, the method 900 may build a word sense database that includes words and feature descriptors, an accompanying score, and possibly an accompanying domain assignment. It should be noted that the method 900 is just one implementation and that the operations of the method 900 may be rearranged or otherwise modified such that other implementations are possible.

Figure 10:
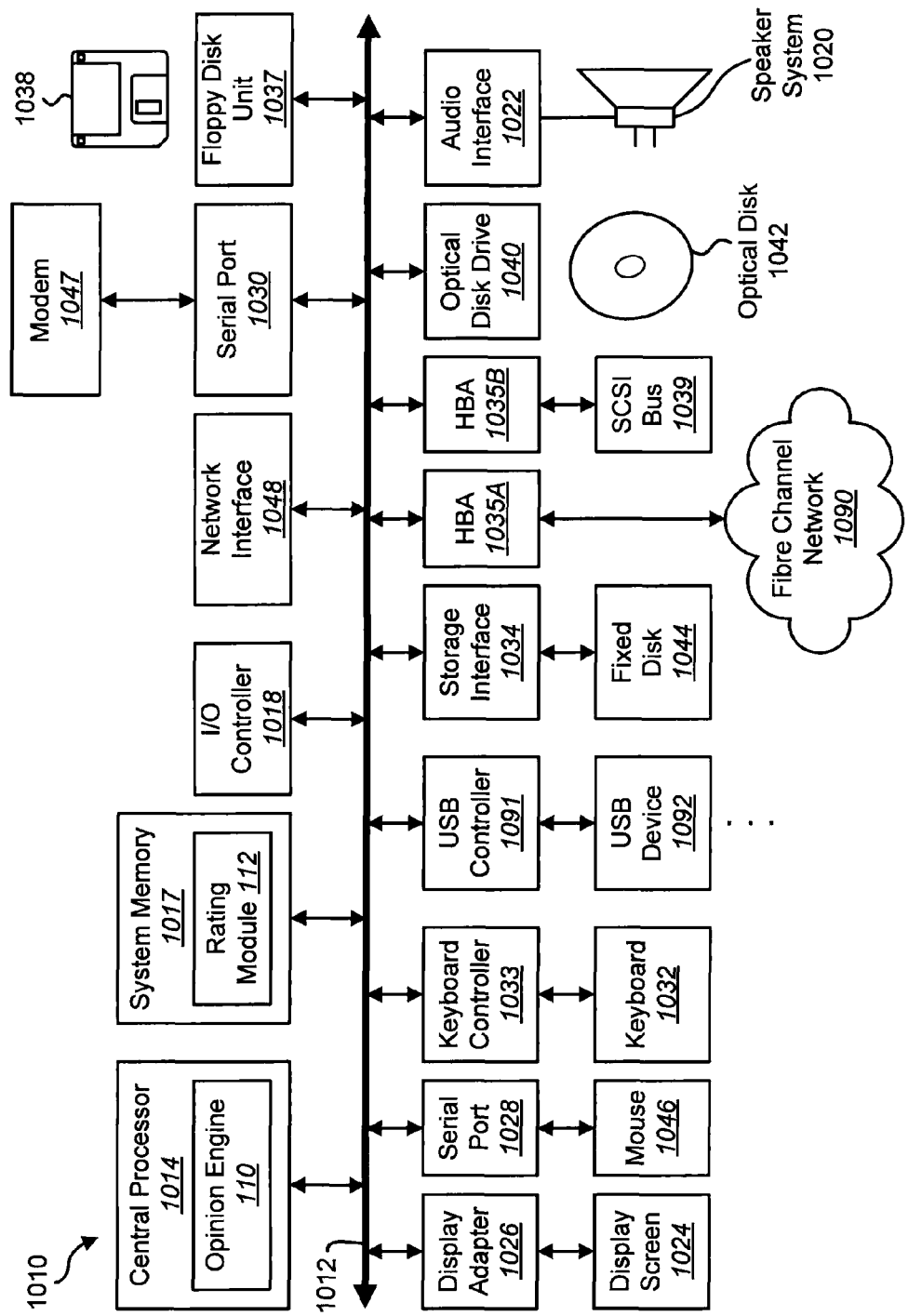
FIG. 10 depicts a block diagram of a computer system suitable for implementing the present systems and methods.

FIG. 10 depicts a block diagram of a computer system 1010 suitable for implementing the present systems and methods. Computer system 1010 includes a bus 1012 which interconnects major subsystems of computer system 1010, such as a central processor 1014, a system memory 1017 (typically RAM, but which may also include ROM, flash RAM, or the like), an input/output controller 1018, an external audio device, such as a speaker system 1020 via an audio output interface 1022, an external device, such as a display screen 1024 via display adapter 1026, serial ports 1028 and 1030, a keyboard 1032 (interfaced with a keyboard controller 1033), multiple USB devices 1092 (interfaced with a USB controller 1091), a storage interface 1034, a floppy disk unit 1037 operative to receive a floppy disk 1038, a host bus adapter (HBA)

interface card 1035A operative to connect with a Fibre Channel network 1090, a host bus adapter (HBA) interface card 1035B operative to connect to a SCSI bus 1039, and an optical disk drive 1040 operative to receive an optical disk 1042. Also included are a mouse 1046 (or other point-and-click device, coupled to bus 1012 via serial port 1028), a modem 1047 (coupled to bus 1012 via serial port 1030), and a network interface 1048 (coupled directly to bus 1012).

Bus 1012 allows data communication between central processor 1014 and system memory 1017, which may include read-only memory (ROM) or flash memory (neither shown), and random access memory (RAM) (not shown), as previously noted. The opinion engine 110 may be an example of the central processor 1014. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the rating module 112 to implement the present systems and methods may be stored within the system memory 1017. Applications resident with computer system 1010 are generally stored on and accessed via a non-transitory computer readable medium, such as a hard disk drive (e.g., fixed disk 1044), an optical drive (e.g., optical drive 1040), a floppy disk unit 1037, or other storage medium. Additionally, applications can be in the form of electronic signals modulated in accordance with the application and data communication technology when accessed via network modem 1047 or interface 1048.

Storage interface 1034, as with the other storage interfaces of computer system 1010, can connect to a standard computer readable medium for storage and/or retrieval of information, such as a fixed disk drive 1044. Fixed disk drive 1044 may be a part of computer system 1010 or may be separate and accessed through other interface systems. Modem 1047 may provide a direct connection to a remote server via a telephone link or to the Internet via an internet service provider (ISP). Network interface 1048 may provide a direct connection to a remote server via a direct network link to the Internet via a POP (point of presence). Network interface 1048 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 10 need not be present to practice the present systems and methods. The devices and subsystems can be interconnected in different ways from that shown in FIG. 10. The operation of a computer system such as that shown in FIG. 10 is readily known in the art and is not discussed in detail in this application. Code to implement the present disclosure can be stored in a non-transitory computer-readable medium such as one or more of system memory 1017, fixed disk 1044, optical disk 1042, or floppy disk 1038. The operating system provided on computer system 1010 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 11:
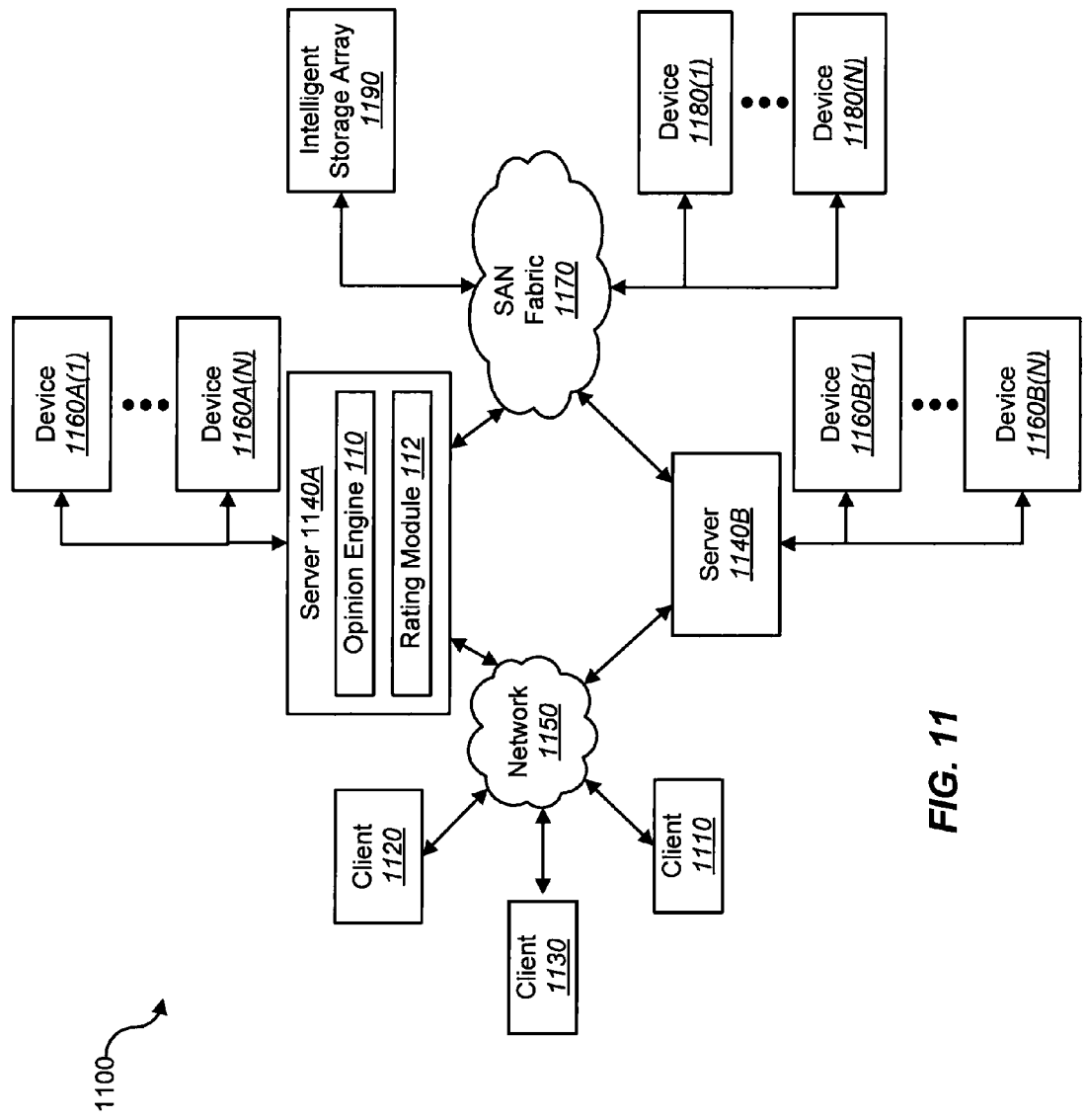
FIG. 11 is a block diagram depicting a network architecture in which client systems, as well as storage servers (any of which can be implemented using computer system), are coupled to a network.

FIG. 11 is a block diagram depicting a network architecture 1100 in which client systems 1110, 1120 and 1130, as well as storage servers 1140A, 1140B (any of which can be implemented using computer system 1110), are coupled to a network 1150. In one embodiment, the opinion engine 110 and the rating module 112 may be located within the storage servers 1140A, 1140B to implement the present systems and methods. The storage server 1140A is further depicted as having storage devices 1160A(1)-(N) directly attached, and storage server 1140B is depicted with storage devices 1160B (1)-(N) directly attached. SAN fabric 1170 supports access to storage devices 1180(1)-(N) by storage servers 1140A, 1140B, and so by client systems 1110, 1120 and 1130 via network 1150. Intelligent storage array 1190 is also shown as an example of a specific storage device accessible via SAN fabric 1170.

With reference to computer system 1010, modem 1047, network interface 1048 or some other method can be used to provide connectivity from each of client computer systems 1110, 1120, and 1130 to network 1150. Client systems 1110, 1120, and 1130 are able to access information on storage server 1140A or 1140B using, for example, a web browser or other client software (not shown). Such a client allows client systems 1110, 1120, and 1130 to access data hosted by storage server 1140A or 1140B or one of storage devices 1160A (1)-(N), 1160B(1)-(N), 1180(1)-(N) or intelligent storage array 1190. FIG. 11 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method to determine a rating of an item, comprising:
   collecting a plurality of user reviews with textual information relating to the item;
   identifying a feature descriptor from at least one of the plurality of user reviews;
   obtaining a user assigned non-textual rating for each of the user reviews that contain the feature descriptor;
   assigning a rating to the feature descriptor based on a frequency of occurrence of the feature descriptor in the plurality of user reviews and the user assigned non-textual rating for each of the user reviews that contain the feature descriptor;
   downloading a word sense database from a website, the word sense database being publically available on the website;
   creating a ratings database by modifying the word sense database based on analysis of the plurality of user reviews, wherein the ratings database comprises a list for feature descriptors, each entry of the list of feature descriptors comprising a section for a feature descriptor, a section for a domain associated with the feature descriptor, and a section for the rating associated with the feature descriptor; and
   accessing the ratings database to determine an overall rating for the item.

2. The method of claim 1, further comprising assigning a domain to the at least one sentence, wherein the domain represents a certain attribute of the item.

3. The method of claim 2, further comprising aggregating the rating of the at least one sentence assigned to a domain with ratings of additional sentences assigned to the domain, wherein the additional sentences are included in textual information of additional user reviews of the item.

4. The method of claim 3, further comprising calculating a rating for the domain of the item based on the aggregated ratings of sentences assigned to the domain.

5. The method of claim 1, further comprising identifying one or more feature descriptors in the textual information of the user review, wherein the feature descriptors comprise a noun and an adjective.

6. The method of claim 1, wherein calculating the rating for the at least one sentence comprises:
   aggregating the ratings for the one or more words in the at least one sentence; and
   calculating the rating of the at least one sentence based on the aggregated ratings for the one or more words.

7. The method of claim 1, wherein assigning the rating comprises:
   calculating the frequency of occurrence of the feature descriptor in the textual information of the plurality of user reviews; and
   calculating the rating for the feature descriptor based on the calculated frequency of occurrence and the user assigned rating.

8. The method of claim 1, wherein the item is a mobile application.

9. A computing device configured to determine a rating of an item, comprising:
   a processor;
   memory in electronic communication with the processor;
   instructions stored in the memory and executable by the processor to:
      collect a plurality of user reviews with textual information relating to the item;
      identify a feature descriptor from at least one of the plurality of user reviews;
      obtain a user assigned non-textual rating for each of the user reviews that contain the feature descriptor;
      assign a rating to the feature descriptor based on a frequency of occurrence of the feature descriptor in the plurality of user reviews and the user assigned non-textual rating for each of the user reviews that contain the feature descriptor;
      downloading a word sense database from a website, the word sense database being publically available on the website;
      create a ratings database by modifying the word sense database based on analysis of the plurality of user reviews, wherein the ratings database comprises a list for feature descriptors, each entry of the list of feature descriptors comprising a section for a feature descriptor, a section for a domain associated with the feature descriptor, and a section for the rating associated with the feature descriptor; and
      access the ratings database to determine an overall rating for the item.

10. The computing device of claim 9, wherein the instructions are executable by the processor to:
   assign a domain to the at least one sentence, wherein the domain represents a certain attribute of the item.

11. The computing device of claim 10, wherein the instructions are executable by the processor to:
   aggregate the rating of the at least one sentence assigned to a domain with ratings of additional sentences assigned to the domain, wherein the additional sentences are included in textual information of additional user reviews of the item.

12. The computing device of claim 11, wherein the instructions are executable by the processor to:

calculate a rating for the domain of the item based on the aggregated ratings of sentences assigned to the domain.

13. The computing device of claim 9, wherein the instructions are executable by the processor to:
   identify one or more feature descriptors in the textual information of the user review, wherein the feature descriptors comprise a noun and an adjective.

14. The computing device of claim 9, wherein calculating the rating for the at least one sentence comprises the rating module configured to:
   aggregate the ratings for the one or more words in the at least one sentence; and
   calculate the rating of the at least one sentence based on the aggregated ratings for the one or more words.

15. The computing device of claim 9, wherein assigning the rating comprises the rating module configured to:
   calculate the frequency of occurrence of the feature descriptor in the textual information of the plurality of user reviews; and
   calculate the rating for the feature descriptor based on the calculated frequency of occurrence and the user assigned rating.

16. The computing device of claim 9, wherein the item is a mobile application.

17. A computer-program product for determining a rating of an item, the computer-program product comprising a non-transitory computer-readable medium storing instructions thereon, the instructions being executable by a processor to:
   collect a plurality of user reviews with textual information relating to the item;
   identify a feature descriptor from at least one of the plurality of user reviews;
   obtain a user assigned non-textual rating for each of the user reviews that contain the feature descriptor;
   assign a rating to the feature descriptor based on a frequency of occurrence of the feature descriptor in the plurality of user reviews and the user assigned non-textual rating for each of the user reviews that contain the feature descriptor;
   downloading a word sense database from a website, the word sense database being publically available on the website;
   create a ratings database by modifying the word sense database based on analysis of the plurality of user reviews, wherein the ratings database comprises a list for feature descriptors, each entry of the list of feature descriptors comprising a section for a feature descriptor, a section for a domain associated with the feature descriptor, and a section for the rating associated with the feature descriptor; and
   access the ratings database to determine an overall rating for the item.

18. The computer-program product of claim 17, wherein the instructions are executable by the processor to:
   assign a domain to the at least one sentence, wherein the domain represents a certain attribute of the item;
   aggregate the rating of the at least one sentence assigned to the domain with ratings of additional sentences assigned to the domain, wherein the additional sentences are included in textual information of additional user reviews of the item; and
   calculate a rating for the domain of the item based on the aggregated ratings of sentences assigned to the domain.

* * * * *